United States Patent
Kuki

(10) Patent No.: US 7,260,608 B2
(45) Date of Patent: Aug. 21, 2007

(54) GRAPHICAL USER INTERFACE FOR AN APPLIANCE NETWORK

(75) Inventor: Hikaru Kuki, Nara (JP)

(73) Assignee: Sharp Laboratories of America, Inc., Camas, WA (US)

( * ) Notice: Subject to any disclaimer, the term of this patent is extended or adjusted under 35 U.S.C. 154(b) by 334 days.

(21) Appl. No.: 10/963,840

(22) Filed: Oct. 12, 2004

(65) Prior Publication Data

US 2005/0108286 A1 May 19, 2005

Related U.S. Application Data

(62) Division of application No. 10/117,664, filed on Apr. 4, 2002.

(60) Provisional application No. 60/344,547, filed on Oct. 18, 2001.

(51) Int. Cl.
*G06F 15/16* (2006.01)
*G09G 5/00* (2006.01)

(52) U.S. Cl. .............. 709/206; 715/700; 715/763; 715/772; 345/156

(58) Field of Classification Search ........... 703/22; 340/999; 715/772, 763, 700; 345/156; 709/206
See application file for complete search history.

(56) References Cited

U.S. PATENT DOCUMENTS

| | | | |
|---|---|---|---|
| 5,524,195 A | 6/1996 | Clanton, III et al. | |
| 5,682,469 A | 10/1997 | Linnett et al. | |
| 5,761,648 A | 6/1998 | Golden et al. | |
| 5,839,097 A | 11/1998 | Klausner | |
| 5,883,621 A | 3/1999 | Iwamura | |
| 5,896,133 A | 4/1999 | Lynch et al. | |
| 5,937,391 A | 8/1999 | Ikeda et al. | |
| 5,946,665 A | 8/1999 | Suzuki et al. | |
| 5,963,924 A | 10/1999 | Williams et al. | |
| 5,983,190 A | 11/1999 | Trower, II et al. | |
| 6,061,058 A | 5/2000 | Owens et al. | |
| 6,133,847 A | 10/2000 | Yang | |
| 6,160,926 A | 12/2000 | Dow et al. | |
| 6,243,707 B1 | 6/2001 | Humpleman et al. | |
| 6,246,409 B1 | 6/2001 | Veghte et al. | |
| 6,396,518 B1 * | 5/2002 | Dow et al. | 715/772 |
| 6,469,689 B1 * | 10/2002 | Dow et al. | 345/156 |
| 6,559,882 B1 | 5/2003 | Kerchner | |
| 6,580,950 B1 | 6/2003 | Johnson et al. | |
| 6,587,739 B1 | 7/2003 | Abrams et al. | |
| 6,636,958 B2 | 10/2003 | Abboud et al. | |
| 6,944,584 B1 * | 9/2005 | Tenney et al. | 703/22 |
| 2001/0038392 A1 | 11/2001 | Humpleman et al. | |
| 2001/0052862 A1 * | 12/2001 | Roelofs | 340/999 |
| 2002/0016716 A1 | 2/2002 | Hong et al. | |

(Continued)

OTHER PUBLICATIONS

Search results for peer, http://foldoc.doc.ic.ac.uk/foldoc/foldoc.cgi?peer, visited Jul. 25, 2005.

*Primary Examiner*—Jungwon Chang
(74) *Attorney, Agent, or Firm*—Chernoff, Vilhauer, McClung & Stenzel

(57) ABSTRACT

A graphical user interface is disclosed for use with an appliance network. To improve understanding of the network, the interface includes a metaphorical representation of a connected appliance that is animated to metaphorically simulate an activity related to the appliance.

7 Claims, 10 Drawing Sheets

U.S. PATENT DOCUMENTS

2002/0054119 A1  5/2002  Dow et al.
2002/0060750 A1  5/2002  Islvan et al.

2002/0126323 A1  9/2002  Dow et al.

* cited by examiner

GRAPHICAL USER INTERFACE FOR AN APPLIANCE NETWORK

CROSS-REFERENCE TO RELATED APPLICATIONS

This application is a Divisional of Ser. No. 10/117,664 filed Apr. 4, 2002 which claims the benefit of U.S. Provisional Application No. 60/344,547, filed Oct. 18, 2001.

BACKGROUND OF THE INVENTION

The present invention relates to graphical user interfaces for data processing devices and, more particularly, to a graphical user interface for a data processing network that includes appliances.

Steadily increasing numbers of home appliances are being equipped with digital microcontrollers. While improved performance is typically the reason for incorporating digital control in an appliance, the availability of home appliances with data processing capability has led to recognition that appliances could be connected in a network and controllable from remote locations within the home and from outside the home, such as from an office, or a cellular phone. An appliance network might also be connected to other networks such as the World Wide Web (the "web"), a security system, or an entertainment system. In addition to the convenience of remotely controlling an appliance's operation, networking facilitates remote monitoring of an appliance's performance by a repair organization and promotes safety by warning remote users of potentially dangerous conditions related to the appliance. For the same or similar reasons, devices intended for a particular purpose or use, whether a typical home appliance or not, may be networked in schools, businesses, or other environments.

While appliance networks have the potential to increase convenience and safety, traditional appliance users may find it difficult to conceptualize an appliance network because the function of the network differs from that of the appliances. In addition, appliance networks are principally communication networks and the invisibility of communication further increases the difficulty of conceptualizing interaction between two appliances. For example, checking the status of drying clothes from a display on a microwave oven is not intuitive. An appliance network may also be connected to the Internet with access to e-commerce or other web sites. Users may find it difficult to navigate the Internet and to understand how to achieve a desired objective at a web site through interaction with an appliance.

Graphical user interfaces (GUI) for data processing systems utilize icons to represent physical objects and often a metaphorical representation of the system to aid the user's navigation. For example, a prevalent GUI for personal computers includes icons representing virtual file folders to metaphorically represent the data stored on the computer. However, such GUIs represent the internal data structure of a computing device or program such as a game but are not useful for aiding understanding of the operation of and communication within a network comprising a multiplicity of appliances with disparate functions and operating characteristics.

What is desired, therefore, is a user interface for an appliance network that facilitates understanding the network and the effects of the user's interaction with the network.

DETAILED DESCRIPTION OF THE INVENTION

Figure 1:
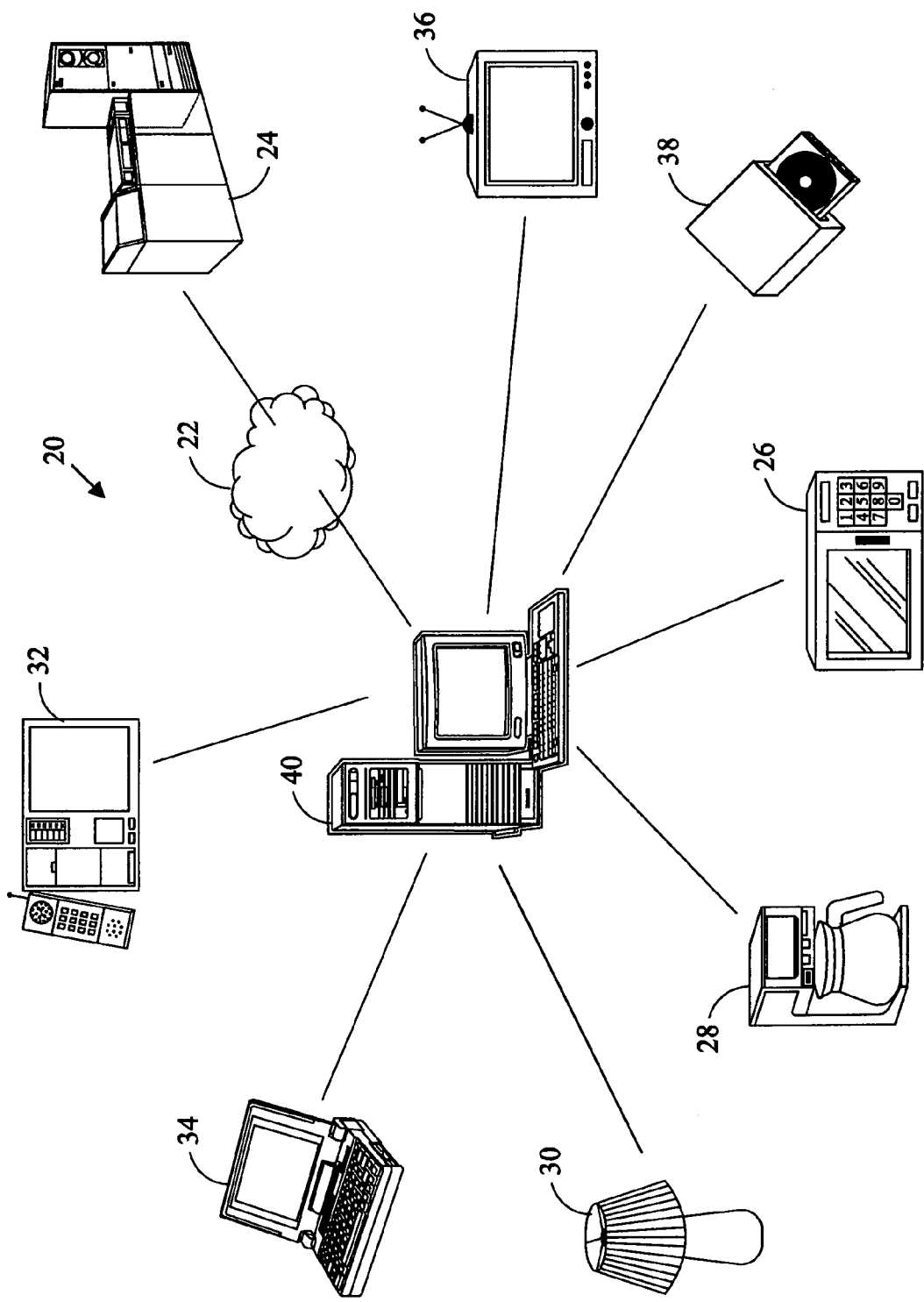
FIG. 1 is a schematic representation of an exemplary appliance network.

Referring to FIG. 1, an exemplary appliance network 20 is generally envisioned as a conglomeration of intelligent appliances, wireless devices, personal computers, and other data processing devices of all form factors. In addition, the network 20 may be connected to other data processing networks, such as the Internet 22, a network of interconnected data processing servers 24 and terminals. An exemplary appliance network 20 may connect several home appliances, such as a microwave oven 26, a toaster (not illustrated), a coffee maker 28, a clothes dryer (not illustrated), building lighting 30, and a heating and air-conditioning system (not illustrated). In addition, the appliance network 20 may include one or more devices that are primarily communication appliances, such as a tablet phone 32, a wireless phone (not illustrated), and a personal computer 34 or an Internet appliance. The network 20 may also be connected to a security system (not illustrated) and elements of an entertainment system 36 and mass data storage 38. While the exemplary network 20 connects a number of appliances that are typically found in the home, the term appliance as used herein intended in the broader sense to mean an apparatus or device intended for a particular purpose or use and which may be used in other than the home, including schools and commercial activities.

An appliance network 20 is basically a communication and control network. However, the concept of an appliance network is not intuitively obvious because the function of the network (communication between appliances) is different from the function of the standalone appliances and communication between network nodes (appliances, web sites, or other devices) is not visible to the user or easy to conceptualize. Further, many potential users of appliance networks are likely to have little or no experience with data processing networks. In addition, appliance networks are likely to be dynamic in nature with ad hoc networks being formed as appliances are either permanently or temporarily added and removed from the network.

Similar problems exist, particularly for new users, with the Internet and the World Wide Web (the "web"). It is often difficult to understand the purpose of a web site and how interaction with a web page displayed on a web browser can accomplish the user's purpose. Conceptualizing interaction with a web page displayed on an appliance can be even more difficult.

The current inventor concluded that the utility of an appliance network would be enhanced if the network incorporated a user interface that presents information tailored to the user's need, supports actions consistent with human reasoning about the network and its function, and provides continuous visual feedback to the user relating operational response of the network to actions taken by the user. The interface of the present invention utilizes an animated metaphorical representation of the appliances or other nodes of the network to analogize or simulate the status, operation or other activity related to the appliance or node. Visual representation of communication aids user recognition of communication procedures and interaction of the connected appliances.

Figure 2:
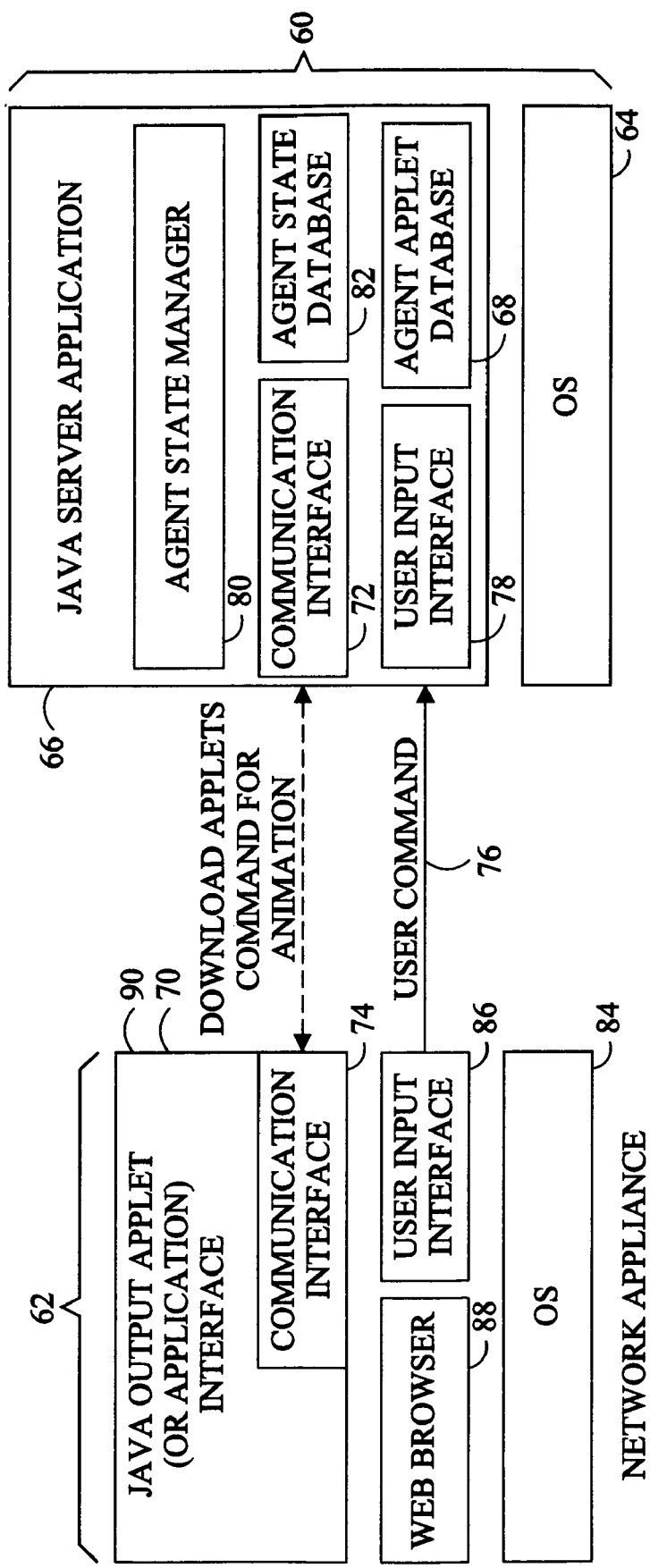
FIG. 2 is a block diagram of the user interface of the present invention.

Referring to FIG. 1, an exemplary appliance network 20 includes a central controller 40 or server and operates in a client-server mode. On the other hand, an appliance network may be based on a peer-to-peer topography with control of the network alternating among several controllers of intelligent appliances. Referring to FIG. 2, the appliance network of the present invention includes a visual agent server 60 (indicated by a bracket) which may be part of a central server or controller 40 or distributed among the controllers of the networked appliances. The visual agent server 60 controls the behavior of agents or animated metaphors for each of the appliances 62 (indicated by a bracket) or other devices (nodes) of the appliance network 20.

The visual agent server 60 includes an operating system 64 and a Java server application 66. An applet, a program executed from another application program, or an application program for each appliance is stored in an agent applet database 68. The computer readable instructions of the applet or application define the agent or metaphorical representation of the appliance and the animated behavior of the agent to metaphorically simulate activity related to the appliance during one or more scenarios or sequence of events selectable by user or system input. When an appliance is energized, the appropriate applet or application 70 is automatically downloaded from the visual agent server and executed. Each movement of the agent is controlled by the visual agent server 60 utilizing an appropriate network communication method such as Java Remote Method Invocation (RMI), Hypertext Transport Protocol (HTTP), or Transmission Control Protocol/Internet Protocol (TCP/IP) and communication interfaces 72 and 74 of the agent server and the appliance. When the visual agent server 60 receives a user command 76, the command is interpreted by a user input interpreter 78. In response, an agent state manager 80 of the visual agent server 60 sends a command to the appropriate appliance 62 or other node directing the appliance to execute the scenario or sequence of events animating the metaphorical representation of the appliance to metaphorically simulate the activity of the appliance corresponding to the user input. When the appliance 62 executes the corresponding scenario in the applet or application, a response is sent to the server 66 indicating completion of the scenario. The response is received by the agent state manager 80 and the current status of the agent is stored in an agent state database 82 of the visual agent server 60. The agent state manager 80 controls the visual agent server's operation by updating the agent state database 82, sending commands to appliances and other network nodes 62, and receiving responses from the nodes.

The typical networked appliance 62 includes an operating system 84 and the appropriate applet or application 70 downloaded from the visual agent server 60 through the communications interface 74. In addition, the appliance 62 includes a user input interface 86, such as a keyboard or key pad, touch screen, pointing device, or a voice recognition and command system. When the user initiates a command to the agent through the input interface 86, the command is directed to the visual agent server 60 where it is translated by the user input interpreter 78. The typical networked appliance also includes an output interface 90 to control a display of the animated agent and may include an audio output device. The appliance may also include a web browser 88 permitting the user to access web pages from one or more of the plurality of appliances connected to the appliance network 20.

Figure 3:
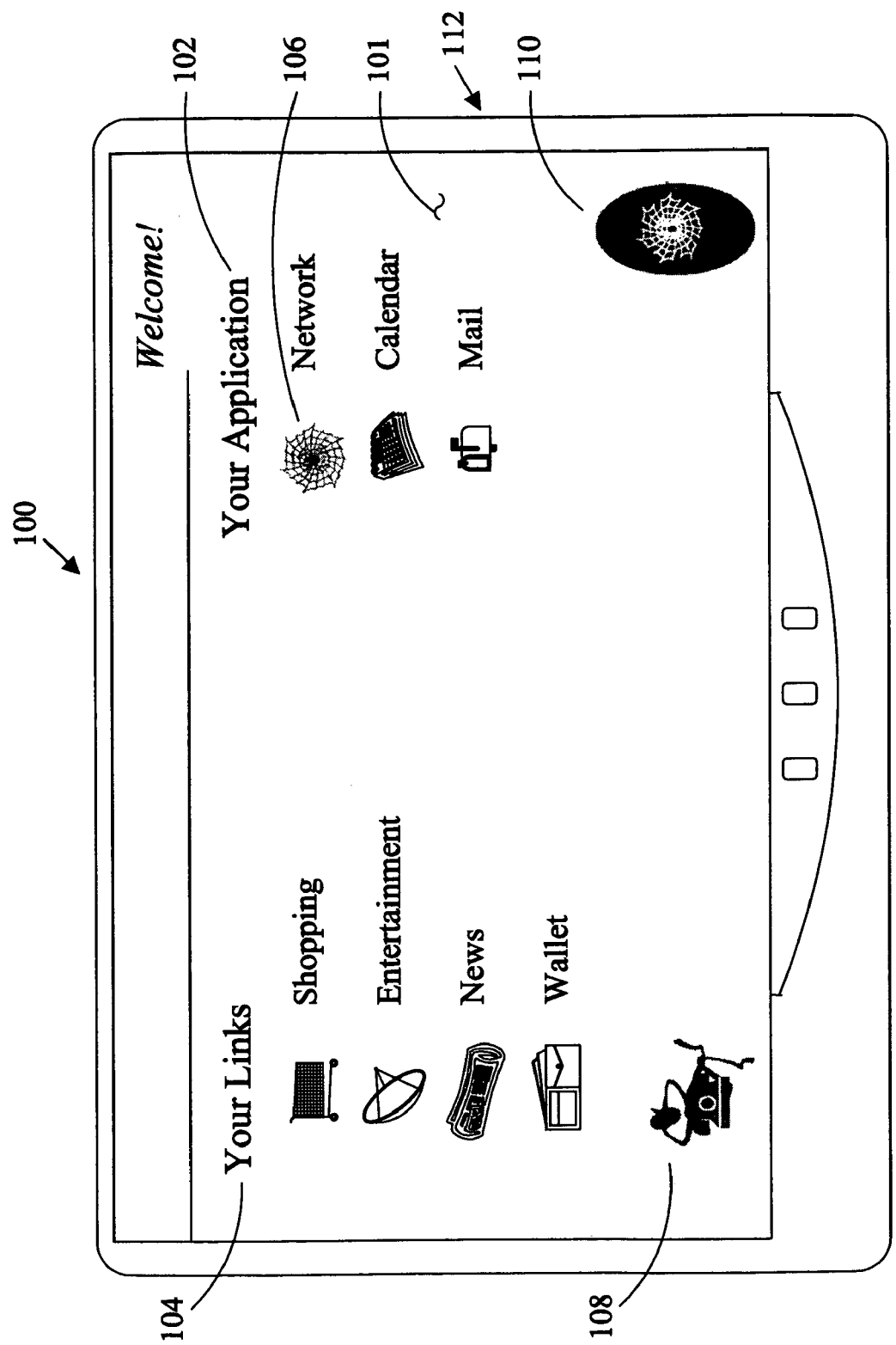
FIG. 3 is an illustration of an exemplary introduction screen displayed on a networked appliance.

Typically, a user's interaction with an appliance network is initiated at an introduction screen 101 such as that illustrated in FIG. 3. The introduction screen 101 might be displayed on the display 100 on a tablet telephone 32 or other appliance and typically includes icons representing the applications 102 and links 104 available to the user from the appliance. The introduction screen 101 may include a selectable icon 106 to display a screen permitting the user an overview of the network, including the agents representing the connected appliances. The introduction screen 101 also displays the visual metaphor or agent 108 for the displaying appliance animated to display the current metaphorical operational state of the appliance. For example, in the introduction screen 101, illustrated in FIG. 3, the agent 108 is resting or asleep indicating to the user that the appliance is not yet engaged in a user assigned task. In addition, the exemplary introduction screen 101 includes a portal 110 metaphorically representing an entrance to the appliance network 20.

Figure 4:
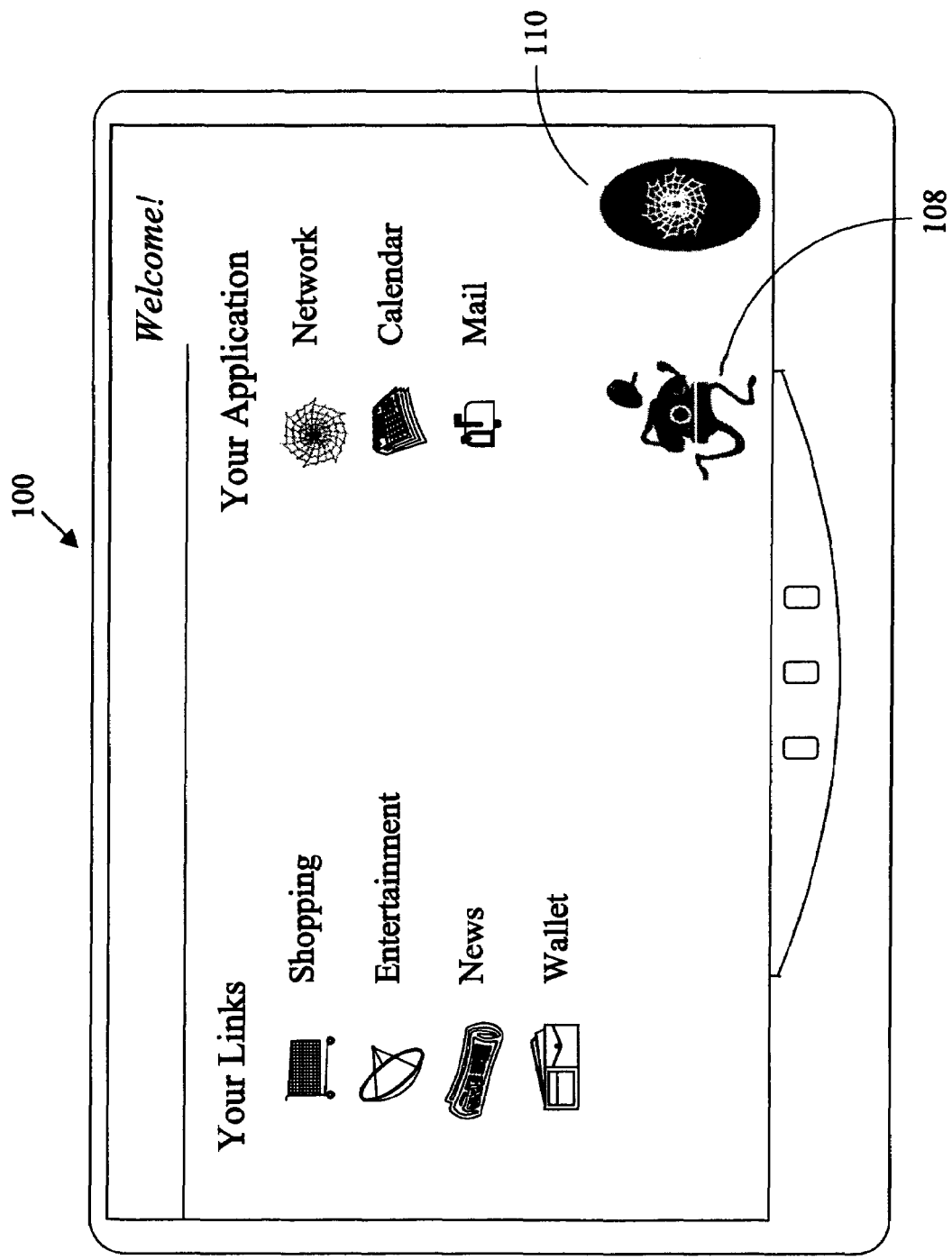
FIG. 4 is an illustration of a display exemplifying the animation of an agent metaphorically representing an first appliance connected to an appliance network.
Figure 5:
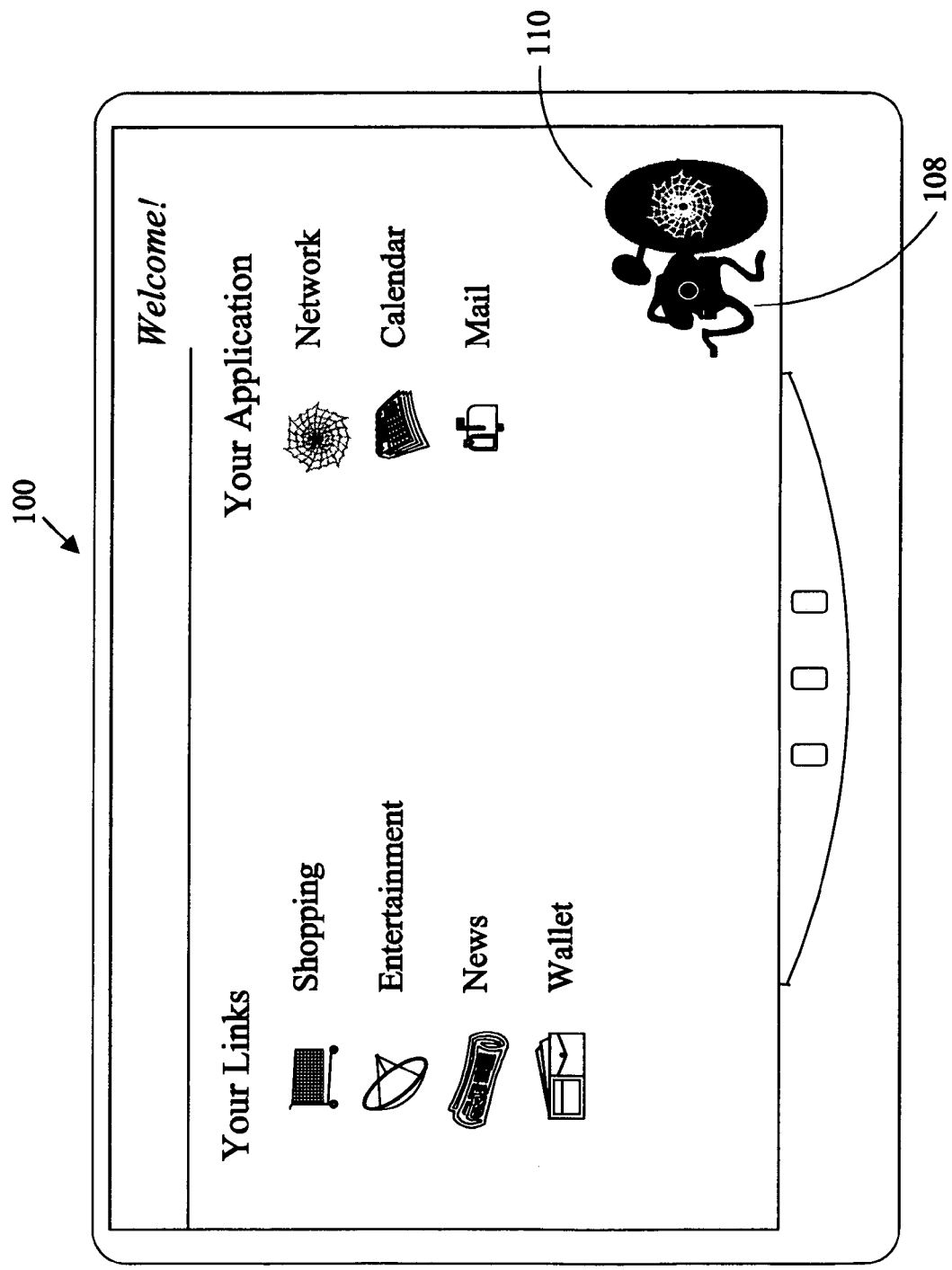
FIG. 5 is an illustration of a display exemplifying the animation of the agent of FIG. 4 to metaphorically simulate a communication with a network.
Figure 6:
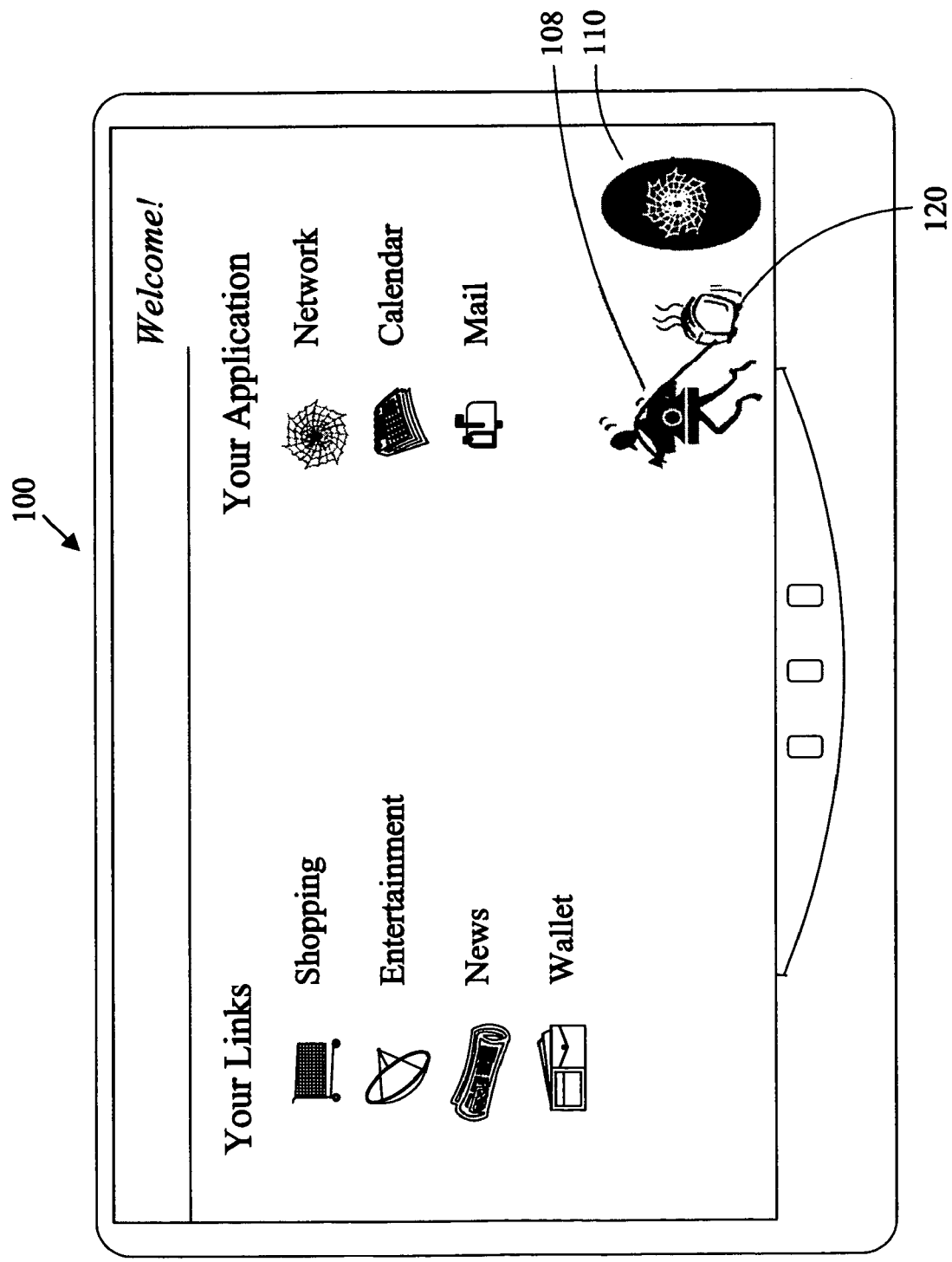
FIG. 6 is an illustration of a display exemplifying the animation of the agent of FIG. 4 metaphorically returning to the user with an agent for a second appliance of the network.
Figure 7:
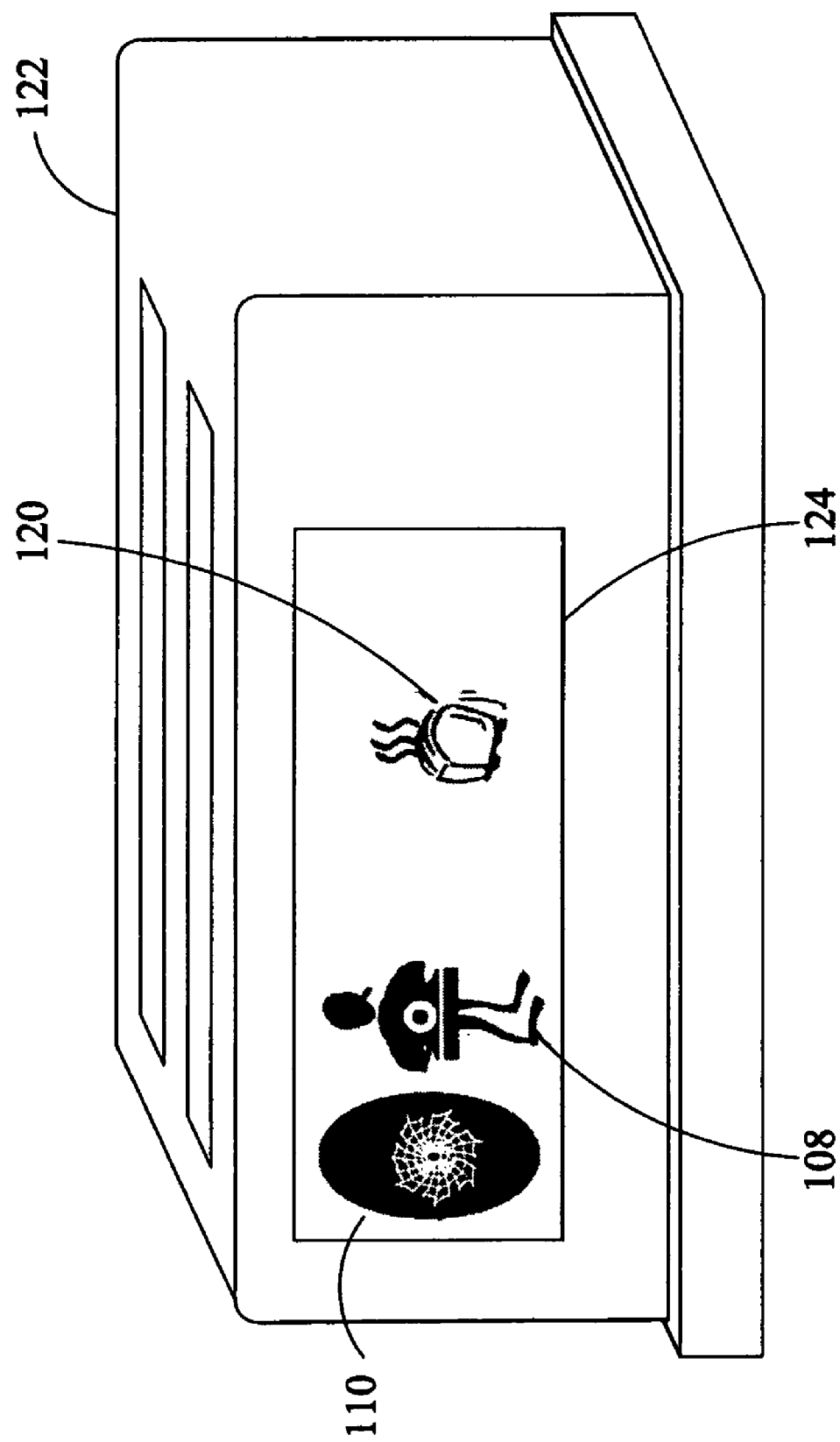
FIG. 7 is an illustration of an exemplary display at the second appliance (a toaster) of FIG. 6 metaphorically representing communication between the second appliance and the agent of the first appliance.
Figure 8:
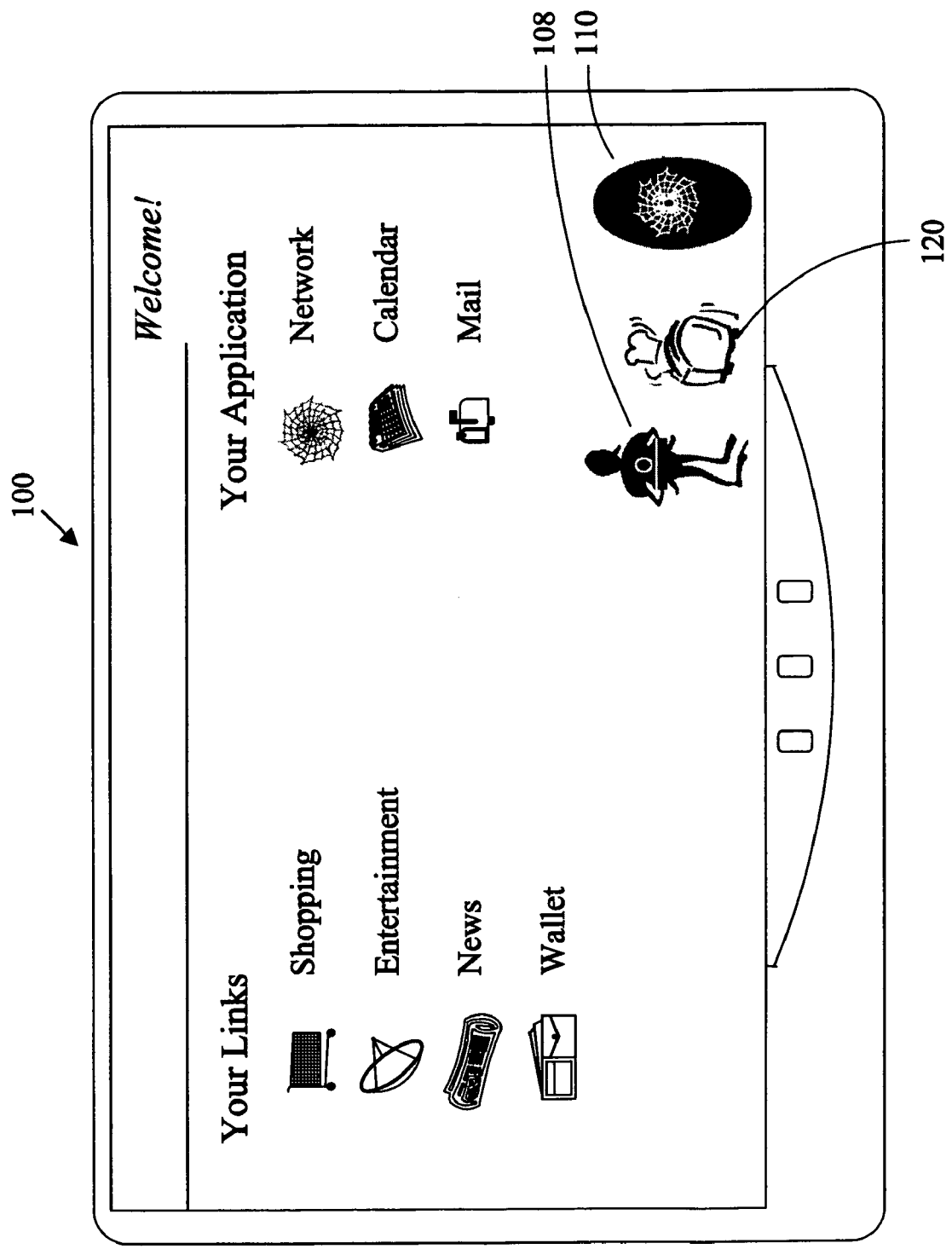
FIG. 8 is an illustration of a display exemplifying the animation of the agent of FIG. 4 querying the status of the second appliance of FIG. 6.

The user inputs a command to the appliance with the device's input interface. For example, the user might speak to the tablet phone 32 and instruct the phone through voice recognition to check the status of a toaster that is connected to the network in some other area of the house. The user's command is input to the visual agent server 60 and the server instructs the appropriate applet or application program for the tablet phone 32 to respond to a scenario of communication with the toaster and animate the metaphorical agent 108 on the tablet phone display panel 100 to metaphorically simulate a journey to the toaster to determine the toaster's status. As illustrated in FIG. 4, the tablet phone agent 108 is animated to "walk" across the display in the direction of the network portal 110. Referring to FIG. 5, the tablet phone metaphor 108 is animated to enter the network portal 110 to communicate over the network or "visit" with the toaster. In accordance with the scenario being executed by the applet or application, the tablet phone agent 108 returns to the screen with the animated metaphor of the toaster 120 as illustrated in FIG. 6. At the same time as illustrated in FIG. 7, the applet or application animating the tablet phone agent 108 and the applet or application animating the toaster agent 120 animate a display of the respective agents to simulate a "visit" by the tablet phone agent 108 to the display 124 of the toaster 122 indicating to a user at the toaster that the toaster is responding to an inquiry from the tablet phone. The animation of the toaster agent 120 indicates to the user that the toaster is in use when communication with the tablet phone is initiated. Further when the toasting is complete, the visual agent server 60 directs an animated change to the toaster metaphor 120 to indicate that the toast is ready as illustrated in FIG. 8. When the task is complete, the tablet phone agent 108 returns to the resting position, as illustrated in FIG. 1, to indicate to the user that the phone is available for another task.

Figure 9:
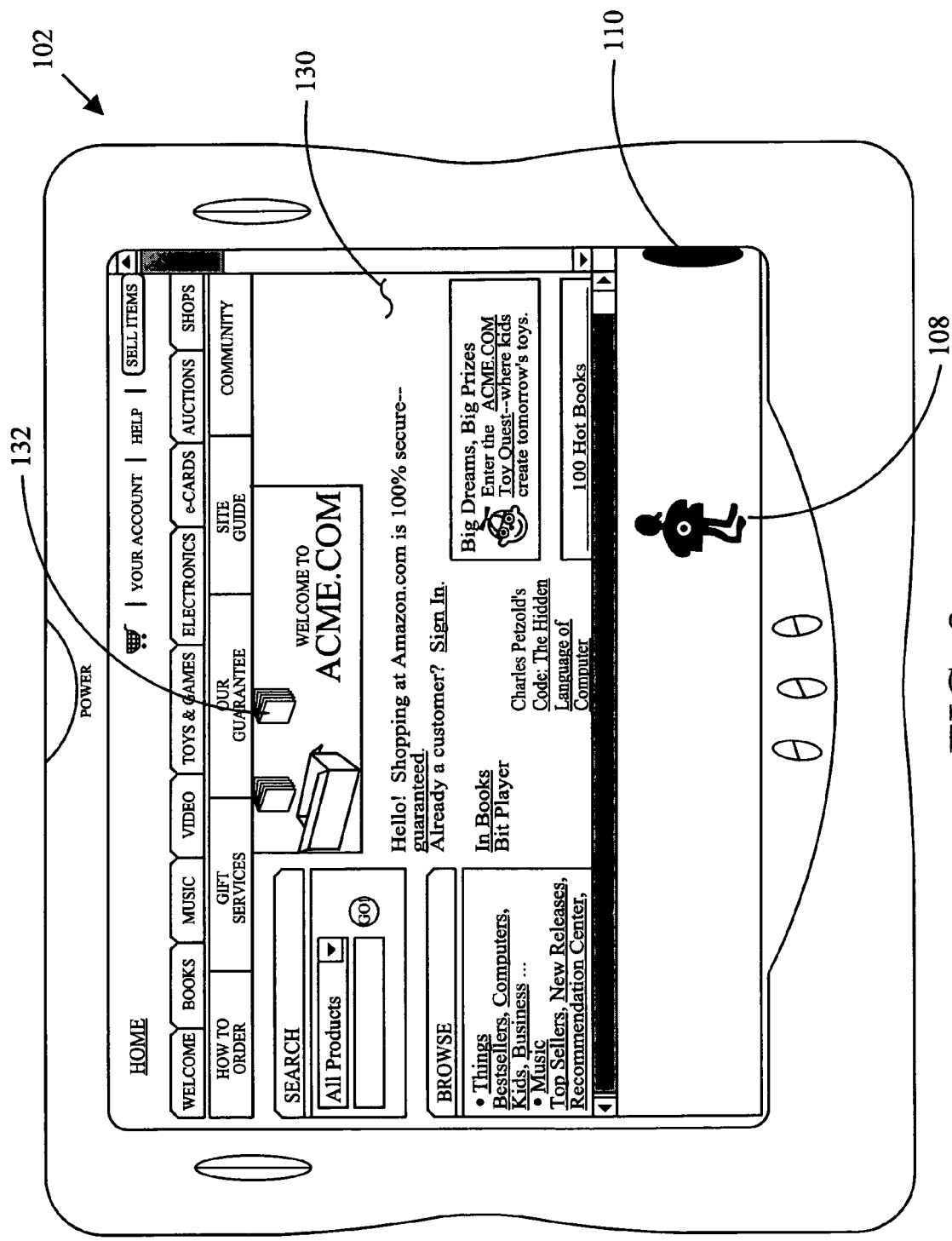
FIG. 9 is an illustration of a display of animated navigation of an exemplary web page by the appliance agent of FIG. 4.
Figure 10:
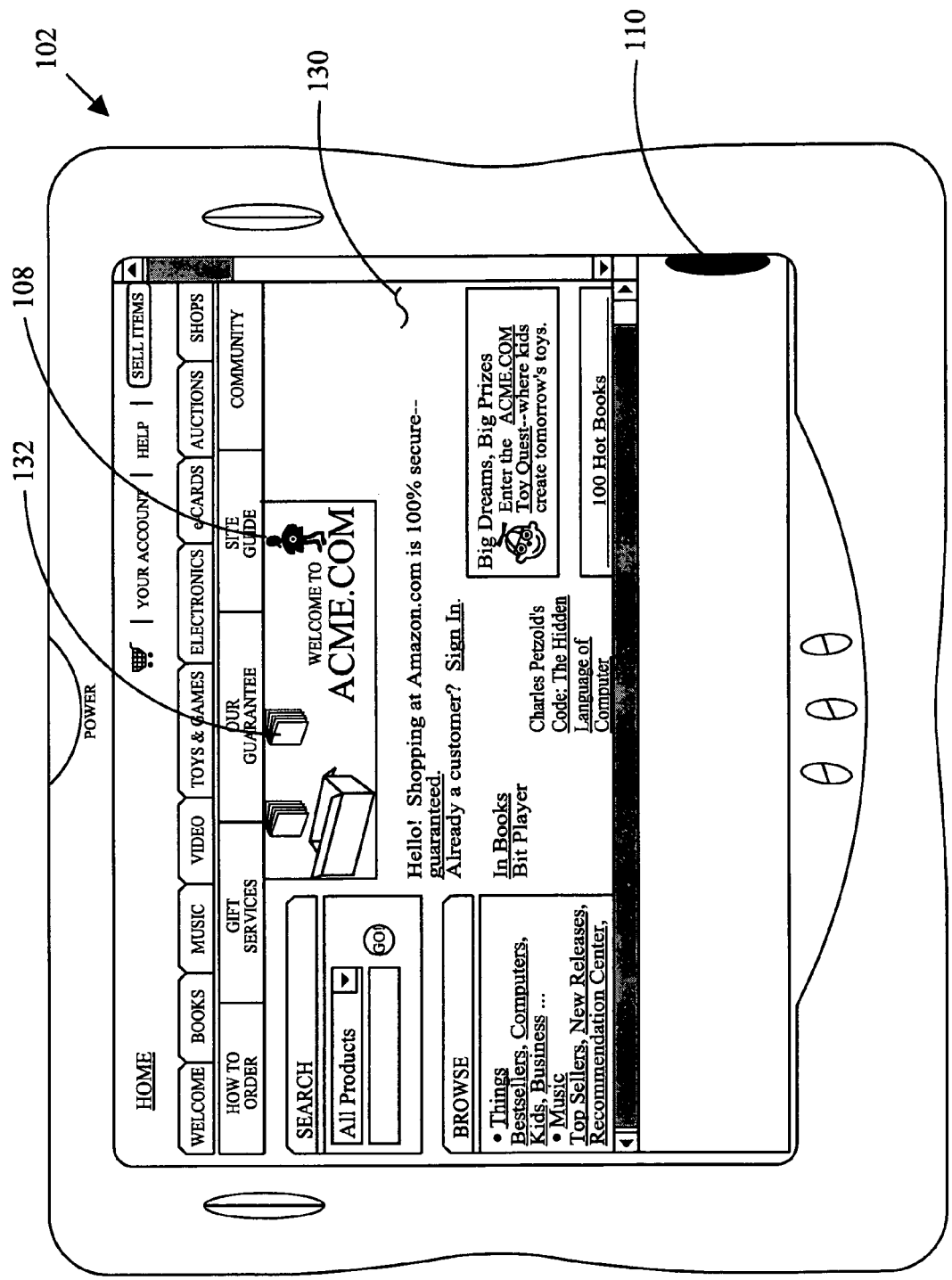
FIG. 10 is an illustration of an interaction between the animated agent of FIG. 4. and the exemplary web page of FIG. 9.

The animated metaphor of the inventive interface also assists in conceptualizing interaction with web sites through a web browser 88 operating on an appliance 62. For example, a user of the tablet phone 32 may be displaying a web page 130 on the phone's display 100 with a web browser as illustrated in FIG. 9. The exemplary web page 130 includes an icon of a coupon book 132 that when selected by the user provides the user with a discount on a future purchase. To obtain the discount, the user inputs a command through the phone's input device instructing the phone agent to metaphorically to "go to the web site and retrieve the coupon." In response to the command, the visual agent server 60 initiates the appropriate scenario for the applet or application at the appliance to simulate of a journey to the displayed web page to retrieve of a coupon 132. The agent or metaphor of the tablet phone 108 is animated by the applet or application and enters the network portal 110 as illustrated in FIG. 5. Referring to FIG. 10, the animated agent 108 is then displayed by the web browser as "visiting" the displayed web 130 where the agent 108 collects a coupon. The agent 108 completes the task by metaphorically "returning" to the tablet phone display 100 and storing the coupon for future use. Likewise, the agent 108 can "visit" a web page to purchase a product by manipulation of appropriate display elements.

The graphical user interface of the present invention promotes conceptualization of the appliance network and activities related to the devices attached to the network. With an animated metaphor for attached appliances the user can envision the network and the appliance's status. Animation of the metaphors to metaphorically perform tasks such as journeying to other appliances to suggest communication aids the user in understanding the effects of the user's interaction with the network.

All the references cited herein are incorporated by reference.

The terms and expressions that have been employed in the foregoing specification are used as terms of description and not of limitation, and there is no intention, in the use of such terms and expressions, of excluding equivalents of the features shown and described or portions thereof, it being recognized that the scope of the invention is defined and limited only by the claims that follow.

The invention claimed is:

1. A data processing network comprising:
   (a) a first appliance including a display on said first appliance and a computer readable instruction describing a sequence of events for an animated metaphorical representation of said first appliance, said sequence of events together comprising simulating a journey of said animated metaphorical representation of said first appliance to a second animated metaphorical representation of a second appliance to determine the status of said second appliance; and
   (b) a visual agent server in communication with said first appliance and controlling execution of said sequence of events in response to an input from a user of said first appliance.

2. The network of claim 1 wherein said visual agent sever comprises:
   (a) an agent state database including a current status of said second metaphorical representation of said second appliance; and
   (b) an agent state manager directing said first appliance to animate said first metaphorical representation in response to an input by a user of said first appliance, receiving a response from said first appliance, and updating a state of said second metaphorical representation in said agent state database.

3. The network of claim 2 wherein said visual agent server further comprises an agent applet database storing at least one computer readable instruction describing a behavior of an animated metaphorical representation of an appliance.

4. A data processing network comprising:
   (a) a first appliance including a display on said first appliance and an input device;
   (b) a computer readable instruction including a representation of said first appliance, said representation including an animated metaphorical simulation of an activity of said first appliance selectable by an input of a user of said first appliance, said activity comprising simulating a journey of said animated representation of said first appliance to a second animated metaphorical representation of a second appliance to determine the status of said second appliance; and
   (c) a visual agent server in communication with said first appliance, said visual agent server receiving a user input from said input device, directing said first appliance to display said animated representation of said first appliance, receiving a response from said first appliance, and recording the status of said animated representation of said second appliance.

5. The network of claim 4 wherein said visual agent server further comprises an agent applet database including at least said computer readable instruction describing a behavior of said animated metaphorical representation of said first appliance.

6. The network of claim 4 wherein said computer readable instruction describing said behavior of said animated metaphorical representation of said appliance causes display of an animated simulation of a journey of said representation of said first appliance to a said second appliance.

7. The network of claim 4 wherein said computer readable instruction describing said behavior of said animated metaphorical representation of said first appliance causes display of an animated simulation of a journey of said representation of said first appliance to a web page.

* * * * *